June 23, 1931.    L. W. LANGFORD    1,811,397
RECORD MAKING MECHANISM
Filed Jan. 20, 1927    2 Sheets-Sheet 1

L. W. Langford, Inventor
BY
ATTORNEY.

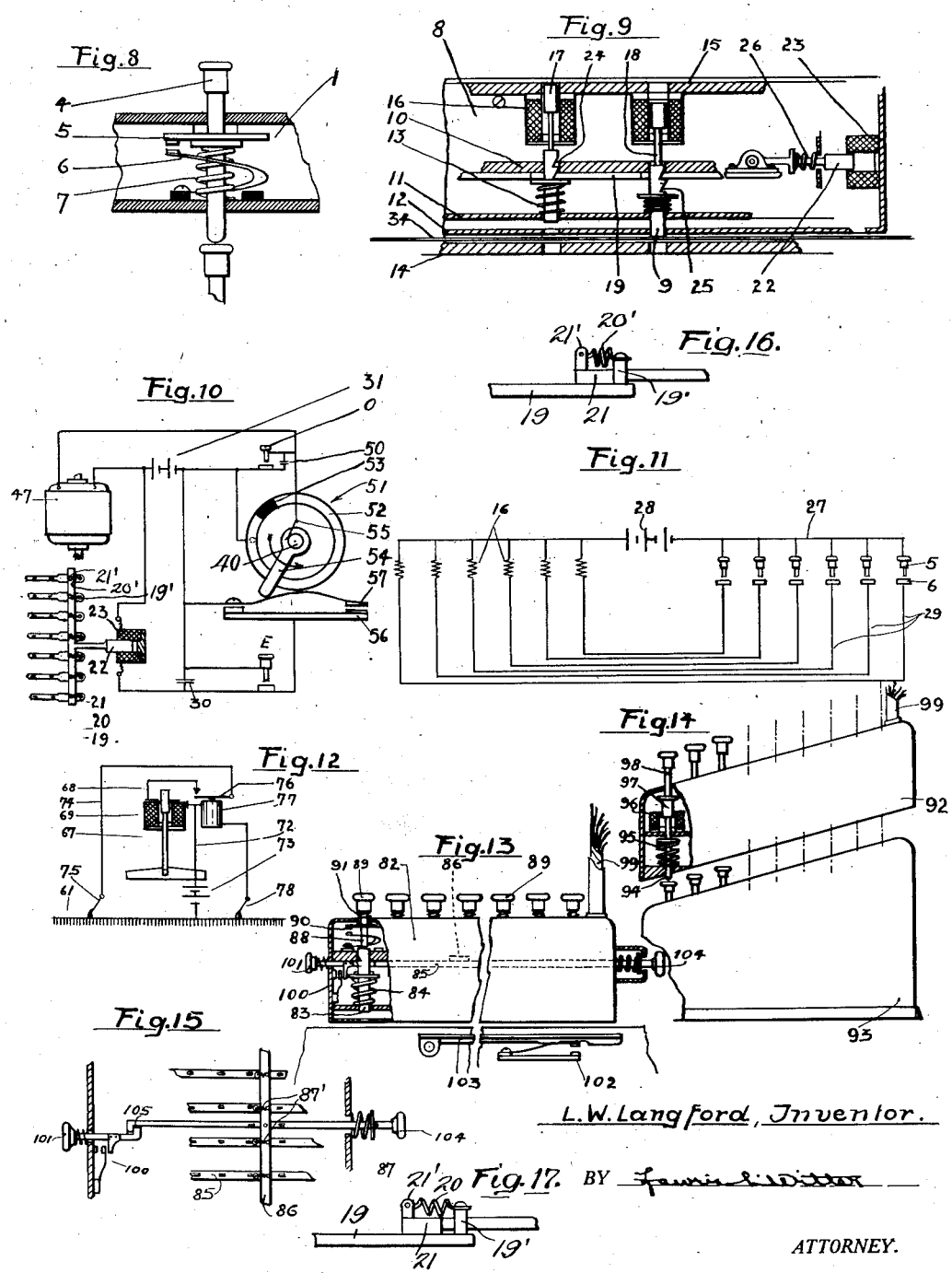

Patented June 23, 1931

1,811,397

UNITED STATES PATENT OFFICE

LEONARD W. LANGFORD, OF BOSTON, MASSACHUSETTS

RECORD MAKING MECHANISM

Application filed January 20, 1927. Serial No. 162,367.

This invention relates to a mechanism for making punched records and it is the primary object of the invention to provide such a mechanism which can be used in conjunction with or as an attachment to an adding or like machine and which will form a punched record of each item simultaneously with the recording of the item on such machine.

It is well known that a large part of the work done on adding and such machines comprises the recording and totaling of amounts in conjunction with the classification of the various items. Usually such amounts are first recorded with or without a classification number in order to secure a general total, which must later balance with the sum of the totals of the various classification groups. For this class of work adding machines with a permanent or variable split keyboard are frequently used. The classifying or descriptive numbers to the left of the split are usually not added but merely indicated on the item strip.

After the items have all been recorded and totaled on the adding machine strip it is then necessary, in most work of this character, to sort the items into their different classification groups and record each group on the adding machine in order to get these respective classification or group totals. For example, a bank is interested not only in the total number or amount of the checks passing through its hands but it is also necessary to secure various sub-totals of these checks, classified in accordance with various requirements. Again, a merchant desires to know not only the total of his sales but also the sub-total of each department, etc.

In accordance with my invention, I propose to make a punched record of each item, the punchings indicating not only the amount of the item but also its classification. My invention relates particularly to a combined punch-press to be used with or as an attachment to an adding machine, it being understood that throughout this specification I intend the term adding or like machine to cover any machine which is capable of tabulating or adding, such, for example, as adding typewriters and the several standard adding machines on the market. In accordance with my invention disclosed herein, this new machine is so constructed and arranged that when used in conjunction with an adding machine, preferably though not necessarily as an auxiliary attachment thereto, punched records of all the various items listed by the adding machine will be automatically formed and sorted into the different classification groups without any additional work whatever on the part of the operator.

These punched records, which are thus obtained without the expense of any labor, may thereafter be used to automatically and mechanically secure lists and totals of the various groups. Machines which operate on punched records for this purpose are well known in the art and need no description herein. However, here again I propose and prefer to use the same adding machine to make up these lists automatically. This is done by running the various groups of punched records through a feeder, preferably automatic in operation, which is so connected to a solenoid keyboard superposed over the adding machine keyboard as to automatically operate the adding machine in accordance with the punched records. In this manner group lists of the various items, in accordance with their classification, are obtained and the sum of the totals thereof must check with the general total if no error has been made.

It is readily conceivable that my invention can be constructed in various forms or modifications and it should therefore be understood that the accompanying drawings are for illustrative purposes only. In Figs. 1 to 12 of the drawings I have illustrated in detail a punching and sorting mechanism which is entirely controlled from an adding machine in a manner automatically making and sorting punched records of all the items recorded on the adding machine without any additional work whatever on the part of the operator. As one modification of this construction, I show in Figs. 13–15 a similar mechanism wherein the punch-press is manually operated, like an adding machine, and so connected to the adding machine as to operate the same mechanically and automatically. In either case the operator need only perform the work usually performed by an adding machine operator.

With the object in view of producing a mechanism for performing the functions above stated, my invention consists broadly in the features of construction and operation set forth in the following specification and illustrated in the accompanying drawings, it being understood, however, that the invention can be otherwise embodied and that the drawings are not to be constructed as defining or limiting the scope of the invention, the claims appended hereto being relied upon for that purpose.

Referring to the figures of the drawing:

Fig. 8 is an enlarged sectional detail view of the superposed keyboard.

Fig. 9 is an enlarged sectional detail view of the punch-press.

Fig. 10 is a wiring diagram of the motor and punch release controls.

Fig. 11 is a wiring diagram of the punch setting mechanism.

Fig. 12 is a wiring diagram of the record sorting mechanism.

Figs. 13 and 14 show a modified form of the invention wherein the punch-press is operated manually and controls the adding machine which is operated mechanically and automatically, Fig. 13 showing the punch-press and Fig. 14 the adding machine.

Fig. 15 is a detail view of the punch releasing mechanism.

Fig. 16 is a side view of the release bars shown in Fig. 10.

Fig. 17 is a like view showing one of the bars in another position.

Figure 1:
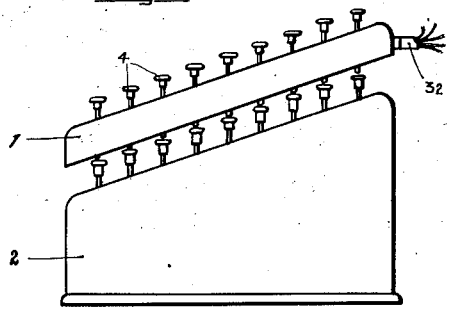
Figure 1 is a side elevation of an adding machine having an auxiliary keyboard superposed over the main keyboard thereof.

The mechanism shown in Figs. 1 to 12 of the drawings broadly comprises an auxiliary keyboard 1 adapted to be superposed over the keyboard of an adding machine 2 and to control the operation of a record punching and sorting machine 3. In the preferred form of the invention, as illustrated herein, the machine 3 is entirely automatic and requires no more work of the operator than that required in the normal operation of the adding machine. The machine 3 through this control makes a punched record of each item recorded on the adding machine and sorts these records into groups in accordance with the various classifications thereof. These punched records are adapted to thereafter be used in automatically obtaining group lists and totals of the various items in the manner well known.

The auxiliary keyboard 1 is provided with a plurality of keys 4 duplicating and respectively superposed over the keys of the adding machine when the auxiliary keyboard is in place, it being understood that the auxiliary keyboard is easily attached to and detached from the adding machine. Secured to the shank of each key 4 (Fig. 8) is one contact element 5 of a switch, the other element 6 of which is resiliently placed therebeneath. A spring 7 normally holds each key 4 in raised position and the contacts 5 and 6 separated. Obviously, the depressing of a key 4 depresses the corresponding adding machine key and closes the switch 5—6.

The punch-press includes a movable punch-head 8 having a plurality of punches 9, one for each amount and classification key of the adding machine. In the machine illustrated, there are fifty-four amount keys indicated by reference letter A, and nine classification keys indicated by reference letter C, and a corresponding number of punches. Each punch is guided in plates 10, 11 and 12 and is normally held in the raised position by a spring 13. A stationary die-plate 14 cooperates with the punches. Supported on the top plate 15 above each punch is a solenoid 16 having an armature 17 therein carrying a pin 18 engaging the punch. The arrangement is such that when a solenoid is energized the armature is drawn downwardly in a manner depressing the corresponding punch.

As a means for holding the punches depressed or set I provide a plurality of bars 19, one for each of the seven rows of punches. Each of these bars is slotted at 20 (Fig. 10) to receive the punches therethrough. These bars are all connected to a crossbar 21 connected to the armature 22 of a solenoid 23. This connection is through springs 20' connected to pins 19' and 21' respectively on the bars 19 and 21. These springs permit the individual movement of the bars 19 to the position illustrated in Fig. 17. Each punch has upper and lower notches 24 and 25 (Fig. 9) therein and into one of which the bar 19 is normally engaged by means of its spring 19' and a spring 26. When a punch is in the up position the bar engages in the lower notch 25. When the punch is depressed the bar snaps into notch 24 and holds the punch depressed. When the solenoid 23 is energized the bars are all shifted against the action of the spring 26 in a manner releasing the set punches.

As illustrated diagrammatically in Fig. 11 each contact 5 is connected by a wire 27 to the solenoids 16 through a battery 28. The contacts 6 are respectively connected to their corresponding solenoids 16 by wires 29. It will therefore be understood that when any key 4 is depressed the corresponding punch is automatically depressed and latched into punching position. Should an error be made in setting up the keys, the error key E over the error key of the adding machine is depressed. This key has a switch 30 (Fig. 10), like the switch 5—6, which switch is thereby closed in a manner energizing the solenoid 23 through the battery 31 and releasing all the set punches. Thus, in case of error, the adding machine and punch-press are simultaneously brought back to normal position merely by depressing the error key E. The wires 27 and 29 are carried within a cable 32 connecting the superposed keyboard and punch-press.

The punched records 33 (Figs. 4 and 7) are preferably made from a continuous roll of paper 34, (Fig. 3) which, after being fed to the punch-press and punched, is automatically cut off by a knife 35 to form a ticket which is delivered to the sorter. The punching positions are indicated on the ticket shown in Fig. 7. It will be noted that the fifty-four amount punches A' are set in nine rows of six punches each and the nine classification punches C' are positioned in staggered relation to such rows. The sorting of the records is automatically controlled by the nine classification punchings and the purpose of staggering these with relation to the amount punchings is to avoid contact through the amount punch holes, all of which will hereinafter appear.

The punch-head 8 is mounted on four studs 36 (Fig. 6) two at each end of the punch-head, slidable in guides 37 and connected to cross-bars 38 engaging and cooperating with two cams or eccentrics 39 on a shaft 40. At each rotation of the shaft 40 the punch-head is drawn downward into cooperating relation with the die 14. The shearing knife 35 is carried by the punch-head.

The paper is fed from the roll 34 over the die plate and beneath the punch-head by means of a pair of feed rolls 41 and 42 operated in conjunction with rollers 43, the two feed rolls being respectively on opposite sides of the punch-head. These rolls are connected as by chains 44 to the shaft 40 in a manner to be operated at the same rotary speed as the shaft. It will be noted that each roll has a less diametered section 45 and a greater diametered section 46. These diameters are such that the paper is gripped between the rollers 43 and the greater diametered section 46 but is not gripped by the less diametered section 45. Feeding of the paper therefore takes place only when the sections 46 are in contact with the rollers 43.

The punch-head operating shaft 40 and feed rolls 41 and 42 are operated from a motor 47 through the engagement of a worm 48 on the motor shaft with a worm wheel 49 on the shaft 40. The operation of the motor is controlled by a switch 50, (Fig. 10) like the switch 5—6, which is closed when the operating key O is depressed and by an automatic switch 51 operating in conjunction with the shaft 40.

The switch 51 comprises a circular contact plate 52 extending around the shaft 40 continuously except for an insulated gap 53. A contact arm 54 on the shaft 40 rides on the plate as the shaft rotates. One terminal of the motor is connected to the plate 52 and the other terminal is connected to the arm by means of a brush 55. The switch 50 is shunted across the motor terminal wires, as seen in Fig. 10. When the motor is at rest and the parts occupy the positions shown in Fig. 3 the arm 54 is in contact with the gap 53. Closing of the switch 50 starts the motor whereupon the arm immediately comes into contact with plate 52 and thereby keeps the contact closed and the motor running until the arm again reaches the gap. The shaft 40 and feed rolls 41 and 42 have thereupon made one complete rotation.

In Fig. 10 is also illustrated an automatic switch whereby the set punches are released at the end of each punching and feeding operation. This switch comprises one fixed contact 56 connected to one terminal of the solenoid 23 and a cooperating movable contact 57 connected to the other terminal of the solenoid through the battery 31. As soon as the shaft 40 has completed the punching operation the arm 54 forces the contact 57 into engagement with the contact 56. The solenoid is thereby energized and the bars 19 shifted in a manner releasing the set punches. The switch 30, hereinafter described, is shunted across the wires leading to the solenoid terminals.

After the ticket has been punched and severed it is fed directly to the sorter which is also operated from the motor 47 through worm 58, shaft 59 and worm 60. The sorter comprises a top support 61 having a plurality of openings 62 therein therealong. each leading into a chamber 63. A pair of relatively narrow belts 64 mounted on wheels 65 extend along opposite sides of the support adjacent to the ends of the openings 62 and in a position to engage the opposite edges of the record tickets and slide the same over the support.

Supported directly over each opening 62 is an elongated pusher plate 66 connected by a rod 67 to an armature 68 within a solenoid 69. Each armature and plate may be supported and normally held in an up position by a spring 70 hung from a bar 71. Obviously when a solenoid is energized its armature is drawn downwardly in a manner moving its plate into the corresponding opening.

One terminal of each solenoid (Fig. 12) is connected to the support 61 by a wire 72 through a battery 73. A wire 74 leading from the other terminal is connected to a brush 75 resiliently engaging the support. In each connection 74 is a normally closed switch 76 adapted to be opened by the energizing of an electro-magnet 77 controlled by a brush 78 also engaging the support.

It will be noted that the brushes 78 (Fig. 4) are all so positioned as to engage the support in a straight line 79 which line is along an unperforated portion of the tickets. The brushes 75 are each located in a position to respectively engage one of the perforating positions indicated at C' in Fig. 7. There are nine chambers 63, one for each of the nine classifications and the several chambers and the corresponding sections of the support are identical.

It will be obvious that when no ticket is on any one of the supports the corresponding magnet 77 will be energized (through brush 78) and break the circuit to the solenoid 69. When a ticket is brought onto the support beneath the brush 78 the switch 76 immediately closes. Should a classification punching of the ticket be such that a contact is made through the brush 75 the solenoid is energized and moves the plate 66 downwardly into its opening just as the front edge of the ticket is over the opening. The ticket is thereby directed and moved into that chamber (see chamber No. 4, Fig. 3). A tenth chamber 80 and a ticket deflecting plate 81 are provided for receiving any tickets which might through some accident fail to reach one of the prior chambers.

The operation of the mechanism shown in Figs. 1 to 12 and above described may be briefly defined as follows:

Considering that all the several parts are in the normal positions, the operator manipulates the adding machine by depressing the keys 4 of the superposed keyboard 1 in the same manner as he would normally operate the keyboard of the adding machine. Assuming, for example, that the first item to be recorded is in classification #4 and for $15.95. The operator depresses the #4 key in the classification column C and the 1595 keys in the four right hand amount columns A, as indicated by x in Fig. 2. The depressing of each of such keys closes the switches 5—6 thereof and energizes the corresponding solenoids 16 which thereupon operate to depress their respective punches 9. The punches are held depressed by the bars 9. Should an error be made by depressing the wrong key or keys the operator depresses the error key E. This operation brings the adding machine back to normal position and energizes the solenoid 23 which thereupon shifts the bars 19 and releases the set punches. Both the adding machine and punches therefore are brought back to the normal or starting position.

Figure 2:
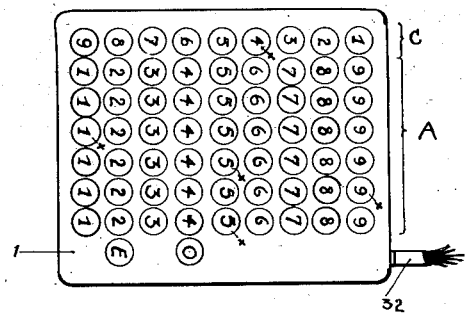
Fig. 2 is a plan view of Fig. 1.

Assuming that the keys marked x in Fig. 2 have been properly depressed, the operator then depresses the operating key O. The adding machine thereupon functions in the usual manner to record the item. Depressing of key O also closes the switch 50 and starts the motor 47. The arm 54 immediately moves onto the contact 52 and maintains such contact for one complete rotation of the shaft 40, when the arm again engages the gap 53. It will, of course, be understood that in a hand operated adding machine the switch 50 would be located in a manner to be automatically closed by the movement of the operating handle in the same manner that the same is closed by the depressing of the operating key O.

Figure 3:
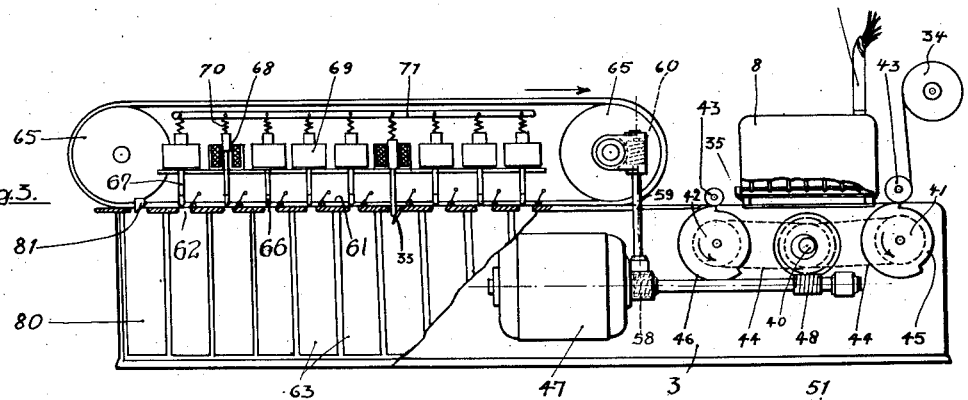
Fig 3 is a side elevation, partly in section, of the complete punching and sorting machine.

By referring to Fig. 3 it will be seen that the first operation of the motor will draw the punch-head downwardly and perform the punching operation and sever the previously punched ticket. Directly thereafter the arm 54 closes the switch 57 to automatically release the set punches which thereupon snap up to their normal position. The feeding portions 46 of the rolls 41 and 42 have then reached the rollers 43 and the strip 34 and the cut-off ticket are fed forward. The latter is thereupon received by the sorter as hereinafter described.

The circumferential dimension of the portion 46 of the feeding roll 41 is such that the width of one ticket 33 is fed from the roll 34 at each rotation of the shaft 40. Therefore, when the parts reach the position shown in Fig. 3, and the motor is automatically stopped by the arm 54 reaching the gap 53, a new blank has been placed beneath the punch-head and the previously punched blank has been fed to a position near but not into the sorter. Furthermore, the parts all come to rest in their normal positions and ready to receive the next item.

Figure 4:
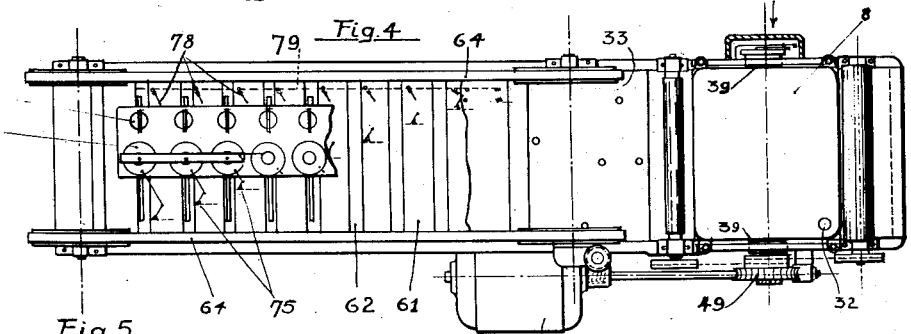
Fig. 4 is a plan view thereof.
Figure 5:
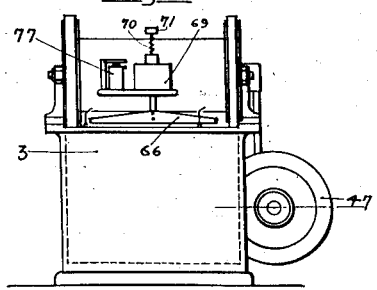
Fig. 5 is an elevation of the left-hand end of Figs. 3 and 4.
Figure 6:
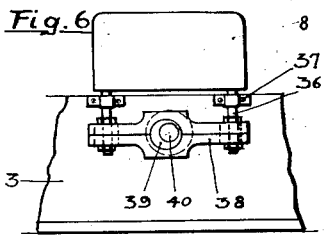
Fig. 6 is a fragmentary side elevation showing the punch-press operating means.
Figure 7:
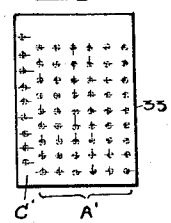
Fig. 7 shows a record ticket and the punching positions thereon.

It will be noted that the punched ticket 33 shown in Fig. 4 has five punchings therein. The extreme left hand punching is the #4 classification punching; the other four punchings indicate $15.95.

At each operation of the motor 47 the previously punched and severed ticket is fed to the sorter, the belts 64 of which are driven in the direction of the arrow (Fig. 3) by the motor. These belts engage opposite edges of the ticket and move the same over the support 61, the ticket sliding freely over the support until deflected therefrom.

Each of the brushes 75 is in alignment with one of the classification punching positions C' in a manner to make a contact with the support through the ticket whenever a punching appears in that position. The circuit to each solenoid 69 is broken by the electromagnet 77 when no ticket is on its section of the support. However, when a ticket slides thereon beneath the brush 78, the switch 76 immediately closes.

The ticket shown in Fig. 4 is punched in the #4 classification position. When this ticket, for example, rides onto section #4 of the support above such support the switch 76 closes. When the brush 75 of this #4 position makes a contact through the classification punching, the solenoid 69 is energized and the forward portion of the ticket is deflected downwardly through opening #4 into its chamber 63 (see Fig. 3). The continued movement of the belts 64 moves the ticket on into the chamber. It will, of course, be understood that tickets punched in any of the nine classification positions will be sorted in like manner.

As previously stated herein, it is obvious that the spirit of my invention can be carried out in various forms and, as one other similar form, I have illustrated a modification thereof in Figs. 13, 14 and 15. Briefly, it may be stated that this modified construction is substantially a reversal of that above described; i. e. while in the mechanism shown in Figs. 1–12 the adding machine unit is operated manually and the punch-press controlled therefrom and operated automatically, in the mechanism of Figs. 13–15 the punch-press is operated manually and the adding machine unit is controlled therefrom and operated automatically.

The punch-press head 82 is provided with the same number of punches 83 and in the same arrangement as those of the head 8. A spring 84 normally holds each punch in its raised position and each punch is notched to receive a punch holding bar 85. The seven bars 85 are secured together by a cross-bar 86, like the bars 19, and normally held in the notch-engaging position by springs 87 and 87′.

Mounted over and engaging each punch is an independent punch-operating pin 88 having a button or key 89 thereon. Each punch-pin is provided with a switch 90, like the switch 5—6, which is closed when the punch-pin is depressed. Springs 91 immediately raise the punch-pins back to their normal position and open the switches 90.

The superposed keyboard 92 over the adding machine 93 comprises a plunger 94 for each key. Each plunger is normally held in the raised position by a spring 95. The plungers are adapted to be depressed by solenoids 96 acting on armatures 97 on the plungers, one for each plunger. The plungers are also preferably provided with button extensions 98 for manually operating the adding machine when desired. The terminals of each solenoid 96 are respectively connected to the contacts of the controlling switches 90 in the same manner as is indicated diagrammatically in Fig. 11, these connecting wires extending through a cable 99.

The solenoid of the error key of the keyboard 92 is connected to a switch 100 whereby the error key is depressed when the knob 101 is drawn outwardly to release the set punches. The solenoid of the operating key of the keyboard 92 is connected to a switch 102, which is adapted to be closed when the punch-head is drawn downwardly in the punching operation by a hand lever 103. The punches are released after each punching operation by forcing a knob 104 inwardly. The bar on which this knob is mounted has a sliding engagement at 105 (Fig. 15) with the bolt carrying the knob 101. Therefore releasing the punches by forcing the knob 104 inwardly, after each punching operation, does not affect the error key switch 100. However, when an error is to be corrected the punches are released through the knob 101 which also depresses the error key of the adding machine through the closing of switch 100. In practice, the punches will preferably be released automatically at the end of each punching operation but it has not been deemed necessary to illustrate such releasing mechanism herein.

The operation of the mechanism shown in Figs. 13–15 is briefly as follows:

Assuming that the parts are all in their normal position, the operator depresses the proper keys 89 and the bars 85 hold the punches depressed. The depressing of the keys closes the switches 90, whereupon the corresponding solenoids 96 are energized and depress the corresponding adding machine keys. Should an error be made the operator releases the set punches by withdrawing the knob 101. This operation closes the switch 100 and depresses the error key of the adding machine, both the punch-press and adding machine being thereupon brought back to their normal positions.

Assuming that the punches have been properly set, the operator depresses the punch-head to perform the punching operation by means of the hand lever 103. This operation closes the switch 102 which energizes the operating solenoid in the keyboard 92 and depresses the operating key of the adding machine. The punches are thereafter released by forcing the knob 104 inwardly. The ticket feeding mechanism for the punch-press may be of any desired construction and it has been thought unnecessary therefore to illustrate the same herein.

It will be understood that I have herein illustrated my invention in a comparatively simple form for purposes of clarity and with no intention of limiting the invention thereto. Many forms of mechanisms for setting up record forming and punching conditions are old and well known in this art and the scope of the invention herein is intended to embody these various forms and obvious modifications relating to any and all parts of the invention.

Having described my invention, what I claim is:

1. An apparatus for making records, comprising the combination of a punch-press having a plurality of punches, a keyboard adapted to be superposed over the keyboard of an adding or like machine in a manner to operate the latter from the former, means for operating the punches to punch record blanks supplied thereto, and means forming connections between the superposed keyboard and punch-press whereby the punches corresponding to the keys depressed are selected.

2. An apparatus for making records, comprising the combination of a punch-press having a die and a punch-head carrying a plurality of punches, a keyboard adapted to be superposed over the keyboard of an adding or like machine in a manner to operate the latter from the former, means including connections between the keys of the superposed keyboard and the punch press whereby the depressing of such keys respectively set the corresponding punches, and means for causing a relative movement of the punch-head and die to perform the punching operation.

3. An apparatus for making records, comprising the combination of a punch-press having a die and a punch-head carrying a plurality of punches, a solenoid cooperating with each punch, a keyboard adapted to be superposed over the keyboard of an adding or like machine in a manner to operate the latter from the former, means providing connections between the keys of the superposed keyboard and the solenoids whereby the depressing of such keys respectively cause energizing of the solenoids and setting of the corresponding punches, and means for causing a relative movement of the punch-head and die to perform the punching operation.

4. An apparatus for making records, comprising the combination of a punch-press having a die and a punch-head carrying a plurality of punches, a keyboard adapted to be superposed over the keyboard of an adding or like machine in a manner to operate the latter from the former, means including connections between the keys of the superposed keyboard and the punch press whereby the depressing of such keys respectively set the corresponding punches, power means controlled from the superposed keyboard for causing a relative movement of the punch-head and die to perform the punching operation, and means for thereafter automatically releasing the set punches.

5. An apparatus for making records, comprising the combination of a punch press member having a plurality of record-forming punching elements, a member adapted to be superposed over the keyboard of an adding or like machine and having a plurality of key operating elements so arranged as to adapt the elements to operate the keys of such machine when the member is thus superposed, manually operable means on one of the said members for operating its said elements, and means including connections between the corresponding elements of the two members whereby manually operating the elements of the said one member will automatically operate the corresponding elements of the other member.

6. An apparatus for making records, comprising the combination of a punch press member having a plurality of record-forming punching elements, a member adapted to be superposed over the keyboard of an adding or like machine and having a plurality of key operating elements so arranged as to adapt the elements to operate the keys of such machine when the member is thus superposed, manually operable means on one of the said members for operating its said elements, means providing electrical connections between the corresponding elements respectively of the two members, a switch in each such connection cooperating with each element of the manually operable member, and a solenoid in each said connection cooperating with each element of the other member, the arrangement being such that operating the manually operable elements automatically operates the corresponding elements of the other member by closing the switches and energizing the solenoids.

7. An apparatus for making records, comprising the combination of a punch press member having a plurality of record-forming punching elements, a member adapted to be superposed over the keyboard of an adding or like machine and having a plurality of key operating elements so arranged as to adapt the elements to operate the keys of such machine when the member is thus superposed, manually operable means on one of the said members for operating its said elements, means including connections between the corresponding elements of the two members whereby manually operating the elements of the said one member will automatically operate the corresponding elements of the other member, means carried by the second named member for depressing the operating key of the adding or like machine, and means including manually operable means on the said manually operable member for causing the last said means and the punch press to function.

8. An apparatus for making records, comprising the combination of a punch press having a plurality of record-forming punches, a member adapted to be superposed over the keyboard of an adding or like machine and having a plurality of key operating elements so arranged as to adapt the elements to operate the keys of such machine when the member is thus superposed, manually operable means on the said member for operating its elements, a plurality of switches respectively cooperating with the manually operable means and elements, and means including connections between the switches and the punch press whereby manually operating the elements will automatically operate the corresponding punches.

9. An apparatus for making records, comprising the combination of a punch press having a punch head carrying a plurality of record-forming punches, a cooperating die, a solenoid cooperating with each punch, a member adapted to be superposed over the keyboard of an adding or like machine and having a plurality of key operating elements so arranged as to adapt the elements to operate the keys of such machine when the member is thus superposed, manually operable means on the said member for operating its elements, a plurality of switches respectively cooperating with the manually operable means and elements in a manner adapted to be closed as the elements are operated, connections between the switches and solenoids whereby the closing of the switches respectively cause energizing of the solenoids and setting of the corresponding punches, means for causing a relative movement between the punch head and die to perform the punching operation, means on the said member for controlling last named means, and means automatically releasing the set punches after each punching operation.

10. An apparatus for making records, comprising the combination of a punch press having a punch head carrying a plurality of record-forming punches, a cooperating die, a solenoid cooperating with each punch, a member adapted to be superposed over the keyboard of an adding or like machine and having a plurality of key operating elements so arranged as to adapt the elements to operate the keys of such machine when the member is thus superposed, manually operable means on the said member for operating its elements, a plurality of switches respectively cooperating with the manually operable means and elements in a manner adapted to be closed as the elements are operated, connections between the switches and solenoids whereby the closing of the switches respectively cause energizing of the solenoids and setting of the corresponding punches, means operative to alternately feed a record blank to the punch head and punch the blank, means on the said member for controlling the last named means, and means for automatically releasing the set punches after each punching operation.

11. An apparatus for making records, comprising the combination of a punch press having a plurality of record-forming punches, a member adapted to be superposed over the keyboard of an adding or like machine and having a plurality of key operating elements so arranged as to adapt the elements to operate the keys of such machine when the member is thus superposed, manually operable means on the said member for operating its elements, a plurality of switches respectively cooperating with the manually operable means and elements, means including connections between the switches and the punch press whereby manually operating the elements will automatically select the corresponding punches and cause such punches to punch a record, means for intermittently feeding a continuous strip of record blank paper to the punch press, means for severing the blanks therefrom after they are punched, and means on the said member for controlling the two last named means.

12. An apparatus for making records, comprising the combination of a punch press having a punch head carrying a plurality of record-forming punches, a cooperating die, a solenoid cooperating with each punch, a member adapted to be superposed over the keyboard of an adding or like machine and having a plurality of key operating elements so arranged as to adapt the elements to operate the keys of such machine when the member is thus superposed, manually operable means on the said member for operating its elements, a plurality of switches respectively cooperating with the manually operable means and elements in a manner adapted to be closed as the elements are operated, connections between the switches and solenoids whereby the closing of the switches respectively cause energizing of the solenoids and setting of the corresponding punches, a power unit, means operated therefrom to alternately feed a record blank to the punch head and punch the blank, means on the said member for controlling the operation of the power unit, and means automatically releasing the set punches after each punching operation.

13. An apparatus for making records, comprising the combination of a punch press having a punch head carrying a plurality of record-forming punches, a cooperating die, a solenoid cooperating with each punch, a member adapted to be superposed over the keyboard of an adding or like machine and having a plurality of key operating elements so arranged as to adapt the elements to operate the keys of such machine when the member is thus superposed, manually operable means on the said member for operating its elements, a plurality of switches respectively cooperating with the manually operable means and elements in a manner adapted to be closed as the elements are operated, connections between the switches and solenoids whereby the closing of the switches respectively cause energizing of the solenoids and setting of the corresponding punches, means operative to alternately feed a record blank to the punch head and punch the blank, means on the said member for controlling the last named means, manually operable means carried by the said member for operating the reset key of the said machine, means to reset the punches, means so connecting the last two named means that operating the former automatically operates the latter, and cooperating means for automatically releasing the set punches after each punching operation.

14. An apparatus for making records, comprising the combination of a punch press having a punch head carrying a plurality of record-forming punches, a cooperating die, a solenoid cooperating with each punch, a member adapted to be superposed over the keyboard of an adding or like machine and having a plurality of key operating elements so arranged as to adapt the elements to operate the keys of such machine when the member is thus superposed, manually operable means on the said member for operating its elements, a plurality of switches respectively cooperating with the manually operable means and elements in a manner adapted to be closed as the elements are operated, connections between the switches and solenoids whereby the closing of the switches respectively cause energizing of the solenoids and setting of the corresponding punches, an electric motor, mechanism operative to alternately feed a record blank to the punch head and punch the blank, means on the said member for causing the said mechanism to operate, and means operated by the motor for automatically limiting the operation of the said mechanism to a predetermined run and for automatically releasing the set punches after the punching operation.

In testimony whereof I affix my signature.

LEONARD W. LANGFORD.